2,998,389
HYDRAULIC PRESSURE TRANSMITTING FLUID
Chester M. White, Rochester, N.Y., assignor to Olin Mathieson Chemical Corporation, a corporation of Virginia
No Drawing. Filed June 11, 1958, Ser. No. 741,219
2 Claims. (Cl. 252—73)

The present invention relates to a new and improved hydraulic pressure transmitting fluid which, while not limited thereto, is particularly adapted for use as a hydraulic brake fluid.

There is a generally increasing demand for higher boiling hydraulic fluids in the transportation industries. Automobiles, for example, have become heavier and faster than ever before and more heat is generated in stopping them. In spite of this, the wheel design of modern automobiles permits less air-cooling of the braking mechanism, thus causing still higher temperatures within the brake cylinders. Furthermore, the master cylinder is located on the fire wall in some makes of autos, and this further serves to increase the temperature of the fluid therein. The major problems involved in approaching the boiling temperature of a hydraulic brake fluid are loss of braking action, or fading, due to the formation of compressible vapor pockets within the cylinders and/or lines and loss of hydraulic fluid due to the expansion involved during vaporization.

These dangers have been recognized by others. Thus, several State legislatures have passed laws forbidding the use of any but heavy-duty fluids in vehicular hydraulic braking systems. Furthermore, the Society of Automotive Engineers has recently stated that 300° F. is the minimum acceptable boiling point for automotive hydraulic brake fluids. The SAE has a second heavy duty specification in which the minimum boiling point is 375° F.

There is no known single substance which can fulfill all the requirements imposed upon a high boiling heavy duty hydraulic fluid, and consequently these fluids must be formulated. Thus, the complete formulation must retain the desirable properties of each of the components and lose the undesirable properties of each of the components. This situation has prevented the appearance of acceptable, high-boiling, heavy duty hydraulic brake fluids on the market. By high boiling is meant approximately 500° F.

It is the object of this invention to provide a high-boiling hydraulic fluid which also fulfills the general specifications for hydraulic brake fluids. Thus, in addition to high boiling point, a good brake fluid must be non-corrosive, must not swell rubber connecting lines and brake cylinder cups, must have lubricant properties to prevent sticking of the pistons, must have good viscosity-temperature characteristics, and a low pour point, and should be compatible and miscible with brake fluids presently in use.

I have now discovered that the addition of a minor amount of certain polyalkylene glycols to certain polyalkylene glycol ethers can modify their properties in such a way so as to produce excellent high boiling hydraulic fluids. This is surprising, since heretofore it has been impossible to blend several components to yield a fluid which boils (refluxes) above 500° F. and also meets all requirements of an acceptable brake fluid as defined by the Society of Automotive Engineers Standard 70–R–1. Other fluid producers have attempted to develop a high boiling fluid by attempting to synthesize a single component type hydraulic fluid.

According to this invention, the components are blended in the following proportions:

| | Percent by weight |
|---|---|
| Polyalkylene glycol | 10–30 |
| Polyalkylene glycol ether | 70–90 |
| Inhibitors and antioxidants | 0.0–2.0 |
| | 100 |

Examples of suitable polyalkylene glycols include diethylene glycol, triethylene glycol, tetraethylene glycol, dipropylene glycol, tripropylene glycol, polybutylene glycol, and mixtures of polyalkylene glycols having molecular weights between 100 and 200. Suitable ethers, for example, include mono- and di-lower alkyl ethers of triethylene glycol, tetraethylene glycol, tripropylene glycol, tetrapropylene glycol, polybutylene glycol, and mixtures of these. By lower alkyl is meant alkyl groups having less than six carbon atoms. The molecular weight of these polyalkylene glycol ethers should be greater than 170 but should not exceed 350. The mono-ethers generally exhibit less rubber swelling than the diethers and are preferred for this reason. Since a certain degree of lubricity is desirable in the brake fluid formulations of this invention, it is advantageous to include a few percent of one of the higher molecular weight ethers, e.g. monobutyl ether of triethylene glycol, diethyl ether of tetraethylene glycol, etc. in the composition. These higher ethers impart sufficient lubricity to the composition so that the addition of other lubricants is unnecessary. Those skilled in the art can readily select a suitable proportion of lubricant to provide the degree of lubricity required for any specific hydraulic fluid, and prepare a composition accordingly. Antioxidants such as phenyl alpha naphthylamine, hydroquinone, p,p′-isopropylidene bisphenol or tertiary butyl catechol and corrosion inhibitors such as diisopropyl ammonium nitrite, mercaptobenzothiazole, phenyl morpholine or triethanolamine ricinoleate are beneficial to any hydraulic system containing the fluid.

The mixtures described above are homogeneous solutions boiling above 450° F., and generally above 500° F. The boiling points and flash points greatly exceed the SAE minimum specifications for these properties. Furthermore, these fluids exhibit little viscosity change over the desired temperature range.

The following compositions further illustrate the invention:

| | Percent by Weight | | |
|---|---|---|---|
| Example | I | II | III |
| Triethylene glycol | 16 | 25 | 10 |
| Monoethyl ether of triethylene glycol | | 49 | 48.7 |
| Monobutyl ether of triethylene glycol | 55.2 | | 25 |
| Mixed n-butyl ether to tri- and tetrapropylene glycol | | 25.4 | |
| n-butyl ether of tetraethylene glycol | 9.7 | | |
| Proprietary polyalkylene glycol monoalkyl ether (Ucon 50 HB 100) | | | 15 |
| Proprietary polyalkylene glycol monoalkyl ether (Ucon 50 HB 170) | 18 | | |
| Inhibitor and antiozidant | 1.1 | 0.6 | 1.3 |
| | 100.0 | 100.0 | 100.0 |
| Properties: | | | |
| Viscosity (centistokes)— | | | |
| 210° F | 3.0 | | |
| 130° F | 7.1 | 5.6 | 5.1 |
| 100° F | 14.5 | | |
| −40° F | 1,650 | 1,714 | 1,035 |
| Cold Test (144 hrs. at −40° F.) | Clear | Satisfactory | Satisfactory |
| Freezing point (6 hours) | <−60° F. | <−60° F. | <−60° F. |
| Boiling Point (reflux) | 518° F. | 508° F. | 512° F. |
| Flash point (COC) | 310° F. | 285° F. | 290° F. |
| Corrosion (120 hours at 210° F.) Weight change, mg./cm².— | | | |
| Tinned iron | 0.1 | 0.0 | 0.0 |
| Steel | 0.1 | 0.0 | 0.0 |
| Aluminum alloy | 0.0 | 0.0 | 0.0 |
| Cast iron | 0.0 | 0.0 | 0.0 |
| Brass | 0.0 | −0.1 | 0.0 |
| Copper | 0.0 | 0.0 | 0.0 |
| Natural Rubber Swelling (120 hrs. at 158° F.) | 0.028″ | 0.025″ | 0.021″ |
| GRS Rubber Swelling (70 hrs. at 250° F.) | | 0.034″ | 0.036″ |

It is claimed:

1. A composition suitable for use as a hydraulic fluid consisting essentially of (a) about 10 to 25 weight percent of triethylene glycol; (b) about 65 to 75 weight percent of at least two polyalkylene glycol monoalkyl ethers selected from the group consisting of the monoethyl ether of triethylene glycol, the monobutyl ether of triethylene glycol, the n-butyl ether of tripropylene glycol, the n-butyl ether of tetrapropylene glycol and the n-butyl ether of tetraethylene glycol; and (c) 0 to 18 weight percent of monohydroxy oxyethylene oxy-1,2-propylene butyl monoether having a viscosity of about 100 to 170 Saybolt Universal Seconds at 100° F. and prepared by the reaction of butanol with a mixture of about equal parts by weight of ethylene oxide and 1,2-propylene oxide; the total amount of components (b) and (c) being about 75 to 90 weight percent based on the total composition.

2. A composition suitable for use as a hydraulic fluid consisting essentially of about 25 percent of triethylene glycol, about 50 percent of the monoethyl ether of triethylene glycol and about 25 percent of at least one material selected from the class consisting of n-butyl ethers of tripropylene and tetrapropylene glycols, the percentages being by weight.

References Cited in the file of this patent

UNITED STATES PATENTS

| | | |
|---|---|---|
| 2,499,551 | White | Mar. 7, 1950 |
| 2,736,709 | Glickman et al. | Feb. 28, 1956 |

FOREIGN PATENTS

| | | |
|---|---|---|
| 674,156 | Great Britain | June 18, 1952 |
| 787,970 | Great Britain | Dec. 18, 1957 |